(12) United States Patent
Kawada et al.

(10) Patent No.: US 10,166,603 B2
(45) Date of Patent: Jan. 1, 2019

(54) METAL 3D PRINTER

(71) Applicant: Sodick Co., Ltd., Kanagawa (JP)

(72) Inventors: Shuichi Kawada, Kanagawa (JP);
Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 119 days.

(21) Appl. No.: 15/208,572

(22) Filed: Jul. 12, 2016

(65) Prior Publication Data

US 2017/0014905 A1    Jan. 19, 2017

(30) Foreign Application Priority Data

Jul. 13, 2015 (JP) .................. 2015-139330

(51) Int. Cl.
| | | |
|---|---|---|
| *B29C 67/00* | (2017.01) | |
| *B22F 3/105* | (2006.01) | |
| *B33Y 30/00* | (2015.01) | |
| *B33Y 40/00* | (2015.01) | |
| *B29C 64/20* | (2017.01) | |
| *B33Y 50/02* | (2015.01) | |

(52) U.S. Cl.
CPC ............ *B22F 3/1055* (2013.01); *B29C 64/20* (2017.08); *B33Y 30/00* (2014.12); *B33Y 40/00* (2014.12); *B22F 2003/1056* (2013.01); *B22F 2999/00* (2013.01); *B33Y 50/02* (2014.12); *Y02P 10/295* (2015.11)

(58) Field of Classification Search
CPC ..... B29C 64/364; B29C 64/371; B33Y 30/00; B33Y 50/00
See application file for complete search history.

(56) References Cited

U.S. PATENT DOCUMENTS

| | | | |
|---|---|---|---|
| 6,215,093 B1 | 4/2001 | Meiners et al. | |
| 8,794,263 B2 * | 8/2014 | Scott ..................... | B33Y 30/00 264/113 |
| 2010/0044547 A1 | 2/2010 | Higashi et al. | |
| 2012/0126457 A1 | 5/2012 | Abe et al. | |
| 2012/0251378 A1 | 10/2012 | Abe et al. | |
| 2014/0301883 A1 | 10/2014 | Wiesner et al. | |
| 2015/0367573 A1 | 12/2015 | Okazaki et al. | |

(Continued)

FOREIGN PATENT DOCUMENTS

| | | |
|---|---|---|
| DE | 102014108061 | 12/2014 |
| EP | 1839781 | 10/2007 |

(Continued)

*Primary Examiner* — Joseph S Del Sole
*Assistant Examiner* — Thu Khanh T Nguyen
(74) *Attorney, Agent, or Firm* — JCIPRNET

(57) ABSTRACT

A metal 3D printer includes: a housing (1) forming a molding chamber (1B); a recoater head (3) reciprocating in the direction of a horizontal U axis in the molding chamber to form a powder layer of a metal; a laser irradiation device (9) irradiating an irradiation region in the powder layer with a laser beam to form a sintered layer; and an inert gas supply device (4). The inert gas supply device includes: a first suction port (V1) disposed on one (14) of the side walls facing each other in the direction of the U axis, which is far away from the irradiation region; a first blowout port (F1) disposed on a side of the recoater head to face the first suction port; and a second blowout port (F2) disposed to face the first suction port across the irradiation region.

13 Claims, 5 Drawing Sheets

(56) References Cited

U.S. PATENT DOCUMENTS

2016/0207147 A1\* 7/2016 Van Hassel ............ B33Y 10/00
2016/0368052 A1   12/2016 Jakimov et al.

FOREIGN PATENT DOCUMENTS

| JP | 2010265521 | 11/2010 |
| JP | 5721886 | 5/2015 |
| WO | 2014199150 | 12/2014 |

\* cited by examiner

METAL 3D PRINTER

CROSS-REFERENCE TO RELATED APPLICATION

This application claims the priority benefit of Japan application serial no. 2015-139330, filed on Jul. 13, 2015. The entirety of the above-mentioned patent application is hereby incorporated by reference herein and made a part of this specification.

BACKGROUND OF THE INVENTION

Field of the Invention

The invention relates to a metal 3D printer for laminate-molding a three-dimensional object as a product by repeatedly sintering metal powder in a molding chamber. In particular, the invention relates to a metal 3D printer that is provided with a device for removing fumes generated by sintering of the metal powder from the molding chamber.

Description of Related Art

The conventional metal 3D printer forms a thin powder layer by spreading metal powder uniformly on a table, and irradiates a specific irradiation region in the powder layer with a laser beam, so as to form a sintered layer. A desired three-dimensional object is formed by stacking a large number of the sintered layers. The metal 3D printer determines the irradiation region of the laser beam for each division layer that is obtained by dividing the three-dimensional object at a predetermined height. In other words, the metal 3D printer decides the irradiation region for each powder layer. In order to prevent deterioration of the metal powder, it is required to remove oxygen from the atmosphere around the powder layer as much as possible. The conventional metal 3D printer maintains a low oxygen concentration by supplying an inert gas, e.g., nitrogen gas, to the molding chamber enclosing the powder layer.

When the metal powder is irradiated by the laser beam, smoke called "fumes" resulting from aggregation of metal vapor is generated. The fumes soar and spread. The fumes that fill the molding chamber may block the laser beam. As a result, the laser beam carrying the required energy does not reach the irradiation region and causes sintering failure. The sintering operation needs to be suspended till the fumes are eliminated to an extent that does not adversely affect the laser beam. Metal dust is harmful to the human body. Moreover, the fine metal particles in the fumes may fall and mix with fresh powder, and impair the product quality.

Patent Document 1 and Patent Document 2 have disclosed a process chamber having a rectangular parallelepiped shape and a method of carrying the fumes away with a flow of inert gas to remove the fumes from the irradiation path of the laser beam. An inert gas inlet is disposed on the upper side of one side wall of the process chamber while an inert gas outlet is disposed on the lower side of another side wall opposite to the one side wall, so as to create a flow of the inert gas across the irradiation region.

Patent Document 3 has disclosed a metal 3D printer that is capable of creating a local inert gas flow to effectively eliminate fumes from the irradiation path of the laser beam. The metal 3D printer creates the local gas flow by supplying a compressed gas from a supply nozzle that is attached to the wall of the chamber. Alternatively, the local gas flow is created by a fan installed in the chamber.

Patent Document 4 has disclosed a metal 3D printer, in which at least two ventilation channels are formed in the table. One of the ventilation channels supplies the inert gas into the chamber while the other discharges the inert gas to the outside of the chamber. The at least two ventilation channels are connected to an intake pump or an exhaust fan via pipes. According to the invention of Patent Document 4, fumes can be removed actively from the vicinity of the generation source of the fumes.

PRIOR ART LITERATURE

Patent Documents

Patent Document 1: U.S. Pat. No. 6,215,093
Patent Document 2: US 2014/301883
Patent Document 3: US 2012/251378
Patent Document 4: US 2010/044547

SUMMARY OF THE INVENTION

Problem to be Solved

The metal 3D printer disclosed in Patent Document 4 sends the inert gas that contains the fumes to a dust collector outside the chamber. The dust collector removes metal fine particles from the inert gas. Then, the purified inert gas is supplied to the chamber again. However, there is a practical limit to the maximum supply amount of the inert gas. If the inert gas is circulated at a flow rate that exceeds the maximum supply amount, the concentration of the inert gas decreases and causes the oxygen concentration in the chamber to exceed the allowable value.

If the opening of the ventilation channel is close to the irradiation region, the powder layer may be disturbed. Besides, if the openings of the two ventilation channels are too close to each other in the chamber, fresh inert gas may be sucked out immediately and may not spread to the entire space of the chamber. In general, as the area of the irradiation region increases, a longer time will be required for sintering the powder and the amount of the fumes generated will also increase. When the amount of the fumes increases, it will take a long time to eliminate the fumes in the chamber and the production efficiency will drop.

In view of the above, the invention provides a metal 3D printer that is capable of efficiently discharging fumes from the molding chamber. Some other objectives or advantages of the invention are explained in the following paragraphs.

Means to Solve the Problem

According to the invention, a metal 3D printer adapted for laminate-molding a three-dimensional object includes: a housing (1) having a plurality of side walls to form a molding chamber (1B); a recoater head (3) reciprocating between a first position and a second position in a direction of a horizontal U axis in the molding chamber to form a powder layer of a metal; a laser irradiation device (9) irradiating an irradiation region in the powder layer with a laser beam to form a sintered layer; and an inert gas supply device (4) circulating an inert gas through the molding chamber to remove fumes generated in the irradiation region from the molding chamber. The inert gas supply device includes: a first suction port (V1) disposed on one (14) of the side walls facing each other in the direction of the U axis, which is closer to the first position than the second position; a first blowout port (F1) disposed on a side of the recoater head to face the first suction port; and a second blowout port (F2) disposed to face the first suction port across the irradiation region.

Preferably, the inert gas supply device includes a suction device (50) that sucks the inert gas in the molding chamber through the first suction port. The suction device may include a casing (52) that surrounds the first suction port, and a fan or a blower (54) that is disposed in the casing. Preferably, the inert gas supply device includes a second suction port (V2) that is disposed on the other side of the recoater head to face the second blowout port.

The metal 3D printer further includes a controller (10) that controls the inert gas supply device. The controller may close the first blowout port and open the second blowout port when the recoater head is in the first position, and close the second blowout port and open the first blowout port when the recoater head is in the second position.

The metal 3D printer further includes a material supply device (7) that supplies powder to the recoater head. The first suction port can be disposed below the material supply device. The housing includes a ceiling, and the inert gas supply device can include a third suction port (V3) disposed on the ceiling. The ceiling includes a lower ceiling (1A), and the material supply device and the third suction port may be disposed on the lower ceiling.

Preferably, the metal 3D printer further includes two guide rails disposed on two sides of the irradiation region to guide the recoater head. The inert gas supply device includes a fourth suction port that is disposed along at least one of the two guide rails and is opened to the irradiation region. The inert gas supply device may include a third blowout port that is disposed on one of the side walls to face the first suction port across the irradiation region.

The housing may include a ceiling that has a window under the laser irradiation device, and the inert gas supply device may include a cylindrical housing surrounding a lower surface of the window and a fourth blowout port formed on the ceiling to be opened to an inside of the cylindrical housing.

Effect of the Invention

The suction device urges the inert gas to flow toward the first suction port across the irradiation path of the laser beam. Consequently, the fumes are eliminated from the irradiation path with higher efficiency. In addition, the ventilation capability of the molding chamber is enhanced and the discharge amount of the fumes is further increased. In particular, since the fresh inert gas is supplied from the second blowout port, when the recoater head is close to the first suction port, the flow of the clean inert gas is still formed in the same direction during the molding.

The metal 3D printer of the invention is capable of minimizing the time that is required for removing the fumes from the molding chamber to an extent allowing the laser beam with the required energy to be irradiated, so as to improve the production efficiency. Moreover, the fumes are removed efficiently to reduce the fine metal particles that drift in the molding chamber, such that the quality and safety are improved.

DESCRIPTION OF THE EMBODIMENTS

An embodiment of the invention is described in detail with reference to the accompanying figures. The dotted lines in FIG. 1 and FIG. 2 indicate a signal line while the dotted lines in FIG. 3 indicate an irradiation path of a laser beam.

Figure 1:
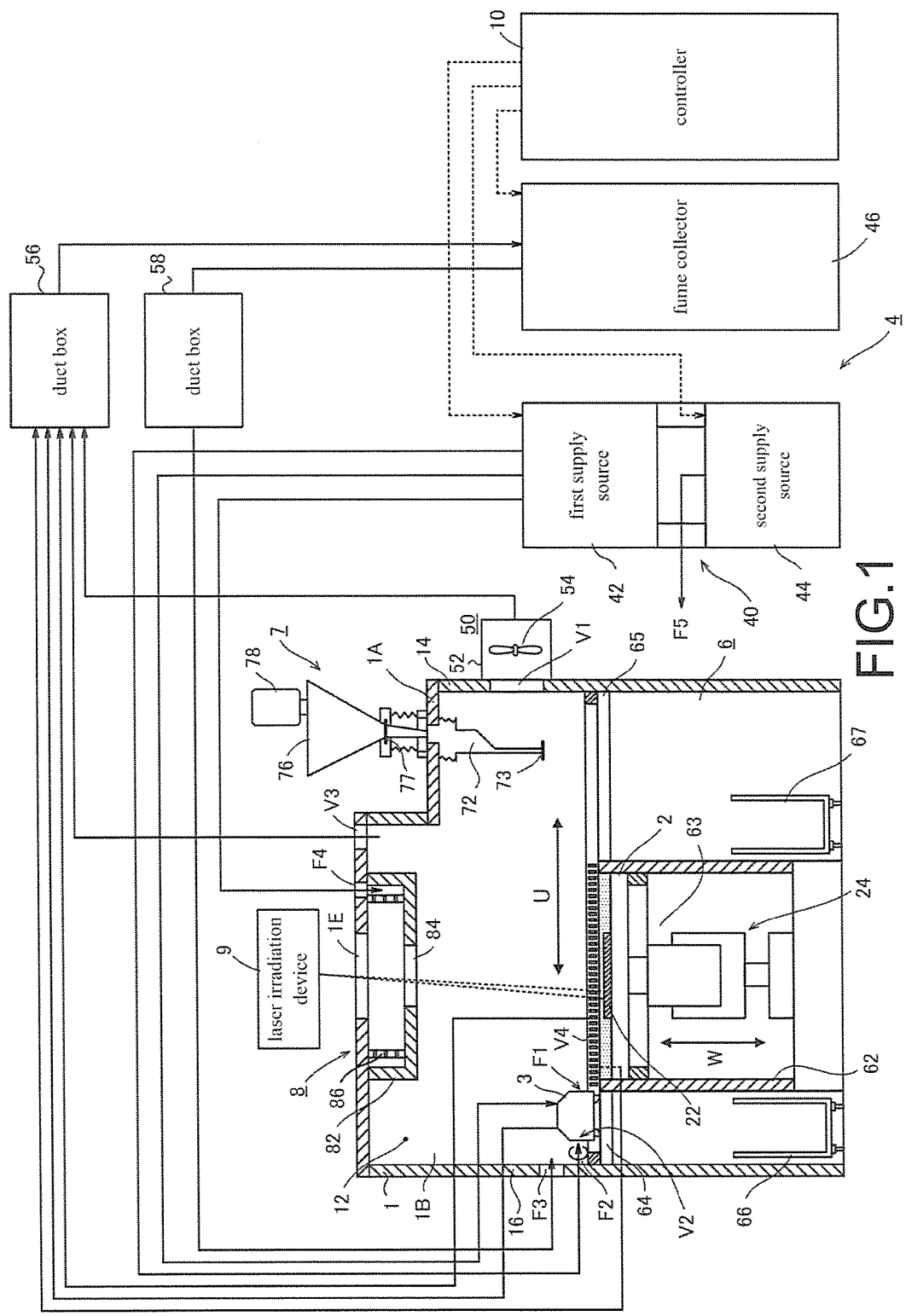
FIG. 1 is a front view showing the metal 3D printer of the invention.
Figure 2:
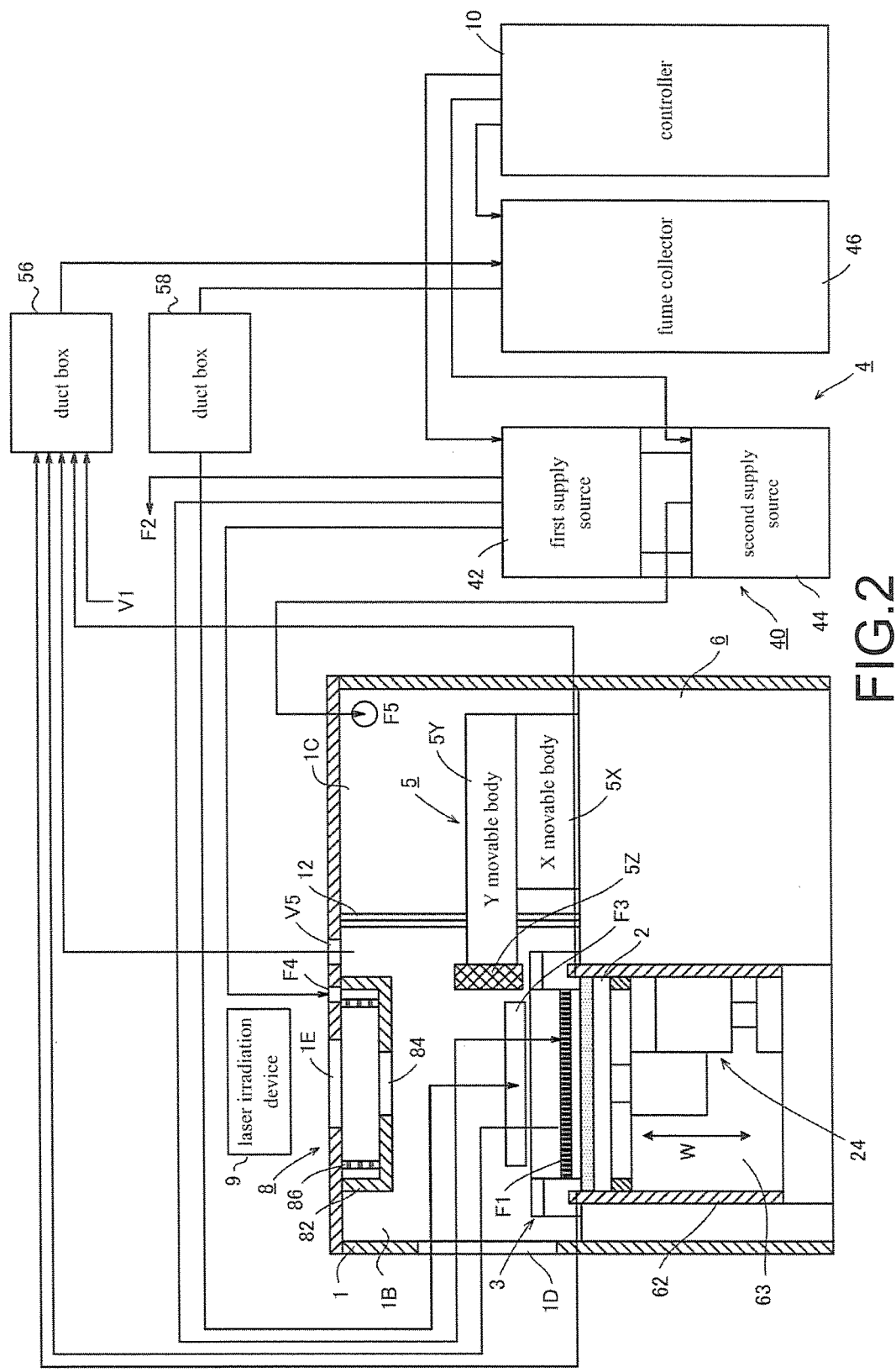
FIG. 2 is a right side view showing the metal 3D printer of FIG. 1.

FIG. 1 and FIG. 2 illustrate a metal 3D printer for laminate-molding a three-dimensional object by repeatedly sintering metal powder. The metal 3D printer includes a housing 1, a recoater head 3, a material supply device 7, an inert gas supply device 4, a power supply, a controller 10, and a fume collector 46. The power supply, the controller 10, and the fume collector 46 are located in the rear of the housing 1.

The housing 1 is a means for forming an environment where an oxygen concentration is less than a predetermined value. The housing 1 includes a ceiling and four side walls and forms a sealed chamber. The sealed chamber is divided into a molding chamber 1B on the front side and a drive chamber 1C on the rear side by a bellows 12. The bellows 12 is extensible/retractable in the lateral direction of the metal 3D printer. A region of a powder layer to be irradiated by the laser beam is called an "irradiation region." The irradiation region is approximately consistent with a region of a division layer obtained by dividing the three-dimensional object at a predetermined height. The molding chamber 1B is a space that surrounds the irradiation region and houses the recoater head 3 and the three-dimensional object. The molding chamber 1B is defined by three side walls of the housing 1, the bellows 12, bases 64 and 65, and a table 2.

A slight gap exists between the molding chamber 1B and the drive chamber 1C for an inert gas to pass. A drive device 5 is housed in the drive chamber 1C for finishing a surface of a sintered layer by using a cutting tool. An opening 1D is formed on the front side wall of the housing 1. The housing 1 is provided with a working door (not shown), so as to close the opening 1D.

A material holding wall 62 having a rectangular cross section is disposed inside a bed 6 to form a central space 63. The table 2 is disposed to be vertically movable in the central space 63. As shown in FIG. 1, a control axis for vertical movement of the table 2 is referred to as a W axis. An annular packing or seal is disposed on the periphery of the table 2. The packing or seal is made of a material that is smoothly slidable on the material holding wall 62. Powder is collected in a space surrounded by the material holding wall 62 and the table 2. The three-dimensional object is directly or indirectly placed on the table 2. A molding plate 22 is fixed on the table 2. The molding plate 22 may be a part of the three-dimensional object.

A W drive device 24 for moving the table 2 in the direction of the W axis in the central space 63 is disposed inside the bed 6. The W axis is a control axis that extends vertically. Buckets 66 and 67 are disposed on the left and right sides of the material holding wall 62 on the inside of bed 6. Powder spread on the table 2 and the molding plate 22 is dropped into the buckets 66 and 67 through a suitable discharge port that is formed on the material holding wall 62.

Figure 3:
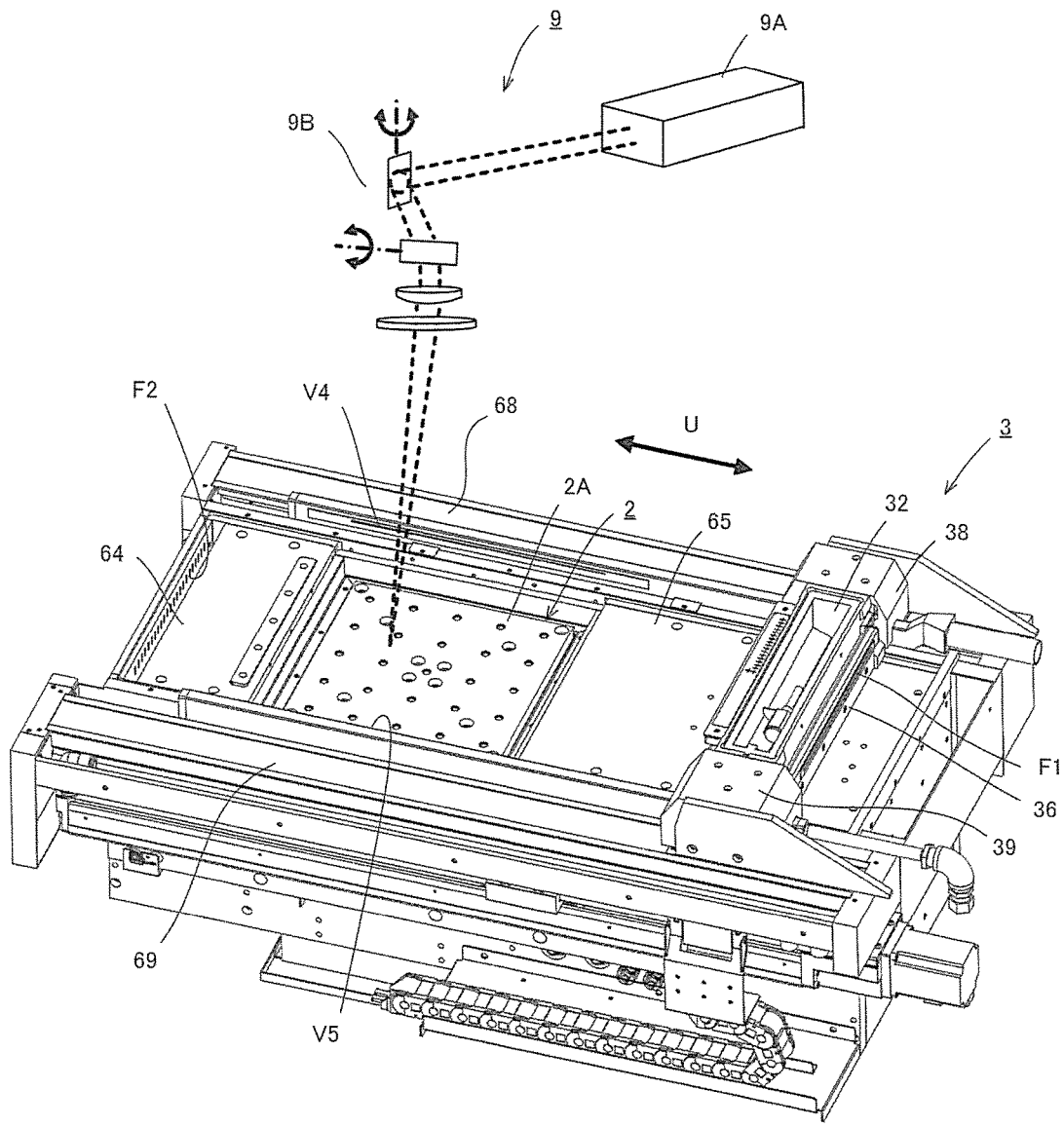
FIG. 3 is a perspective view showing an example of the bases 64 and 65 in FIG. 1.

The bases 64 and 65 having a flat plate shape are fixed on the bed 6, so as to sandwich the table 2. The bases 64 and 65 have horizontal upper surfaces that are at the same height. As shown in FIG. 3, the bases 64 and 65 are separated from each other, and a quadrangular (e.g., square) gap is formed between the bases 64 and 65. The gap between the bases 64 and 65 communicates with the central space 63.

The recoater head 3 is disposed in the molding chamber 1B and reciprocates between a first position and a second position in the direction of a horizontal U axis by a drive device (not shown). The U axis is a control axis that extends in the lateral direction of the metal 3D printer. The recoater head 3 is in the first position in FIG. 3 and is in the second position in FIG. 1. The recoater head 3 extends in a direction perpendicular to the U axis. The recoater head 3 is an example of the means for uniformly spreading metal powder at least on the irradiation region to form the powder layer. It is possible to set a thickness of each powder layer. The recoater head 3 is guided by two guide rails 68 and 69 that are on two sides of the irradiation region. The two guide rails 68 and 69 extend in parallel to the U axis.

The recoater head 3 includes a material storage box 32, two blades 36 and 37 in the same shape, and guide blocks 38 and 39. The material storage box 32 is a rectangular container for storing and dropping powder. The blades 36 and 37 are attached to a bottom surface of the material storage box 32 for uniformizing the thickness of the powder dropped from the material storage box 32. The guide block 38 is attached to one end of the material storage box 32 to be engaged with the guide rail 68 and the guide block 39 is attached to the other end of the material storage box 32 to be engaged with the guide rail 69. The recoater head 3 is described in detail below with reference to FIG. 3, FIG. 4, and FIG. 5.

The material storage box 32 extends in the direction perpendicular to the U axis, and a total length of the material storage box 32 is greater than that of the irradiation region. The material storage box 32 is opened upward, and a long hole 33 that extends in the longitudinal direction is formed on the bottom surface of the material storage box 32. When the material storage box 32 is to be replenished with powder, the recoater head 3 is moved to be directly below the material supply device 7 as shown in FIG. 1. Then, a predetermined amount of powder is allowed to fall freely from the material supply device 7 into the material storage box 32.

Figure 5:
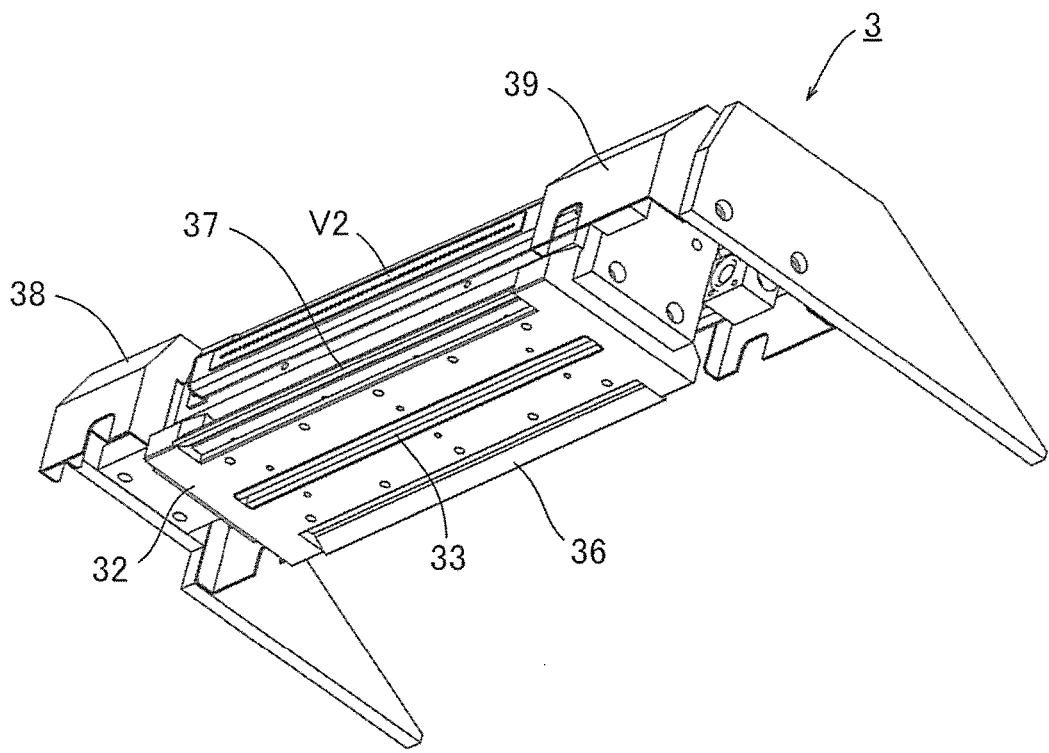
FIG. 5 is a perspective view of the recoater head 3 of FIG. 1 from the lower left direction.

The blades 36 and 37 have substantially the same length as the table 2 in the front-rear direction of the metal 3D printer. Blade edges of the blades 36 and 37 are maintained at the same height. A distance between the blade edges of the blades 36 and 37 and the bases 64 and 65 determines the thickness of the powder layer. As best shown in FIG. 5, the blades 36 and 37 extend in parallel to each other on two sides of the long hole 33 of the material storage box 32.

Figure 4:
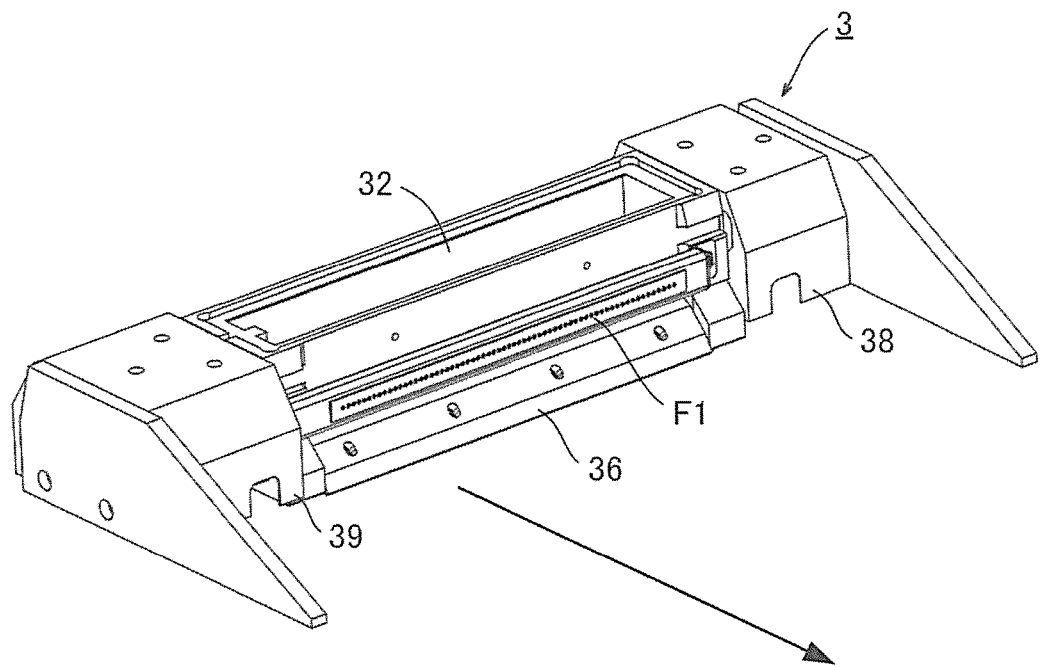
FIG. 4 is a perspective view of the recoater head 3 of FIG. 1 from the upper right direction.

As the recoater head 3 advances in the direction of the arrow in FIG. 4, the blade 36 removes an obstacle from the irradiation region. The obstacle is a chip produced by cutting, for example. During the movement of the recoater head 3, the powder is spread from the long hole 33 of the material storage box 32 through the gap formed between the blade 37 and the bases 64 and 65. When the movement direction of the recoater head 3 is reversed, the functions of the blades 36 and 37 are interchanged.

As shown in FIG. 1, the base 65 on the right is longer than the base 64 on the left in terms of the length in the direction of the U axis. The material supply device 7 is disposed in a space above the base 65 on the right and includes a hopper 76 and a conduit 72. The hopper 76 is disposed outside the housing 1, and the conduit 72 is disposed in the molding chamber 1B and connected to the hopper 76. The hopper 76 has a shutter 77 and the conduit 72 has a shutter 73. The amount of the powder in the material storage box 32 is detected when the recoater head 3 stops in the first position. If the amount of the powder in the material storage box 32 is less than a predetermined value, the conduit 72 is lowered and the shutters 77 and 73 are opened. Consequently, the powder in the hopper 76 falls freely to replenish the material storage box 32. A replaceable powder bottle 78 is loaded into the hopper 76.

The inert gas supply device 4 is a means for supplying a high-purity inert gas from an inert gas supply source 40 into the molding chamber 1B to keep the oxygen concentration in the molding chamber 1B below a predetermined value. Moreover, the inert gas supply device 4 is a means for collecting the inert gas containing fumes from the molding chamber 1B and removing impurities from the inert gas, so as to return the inert gas to the molding chamber 1B.

The inert gas supply device 4 includes the inert gas supply source 40, a dust collector for purifying the inert gas collected from the molding chamber 1B, and a suction device 50. The dust collector is the fume collector 46. The inert gas supply device 4 includes a plurality of blowout ports and suction ports of inert gases, and a pipe connecting each blowout port and suction port.

The inert gas is a gas that does not substantially react with metal powder. The inert gas used in this embodiment is nitrogen gas. The inert gas supply source 40 is a liquid nitrogen cylinder that includes a valve, for example. Besides the nitrogen gas, the inert gas may be argon gas and helium gas. The inert gas supply source 40 includes a first supply source 42 for supplying the inert gas to the molding chamber 1B, and a second supply source 44 for supplying the inert gas to the drive chamber 1C.

The inert gas supply device 4 at least has a first suction port V1, a first blowout port F1, and a second blowout port F2. The inert gas is introduced into the molding chamber 1B from the blowout port near the irradiation region, so as to prevent oxygen from entering the molding chamber 1B through the gap between the table 2 and the material holding wall 62. Fumes are led to the suction port far away from the irradiation region. As a result, fumes are strongly removed from the molding chamber 1B by an appropriate suction device without disturbing the powder layer. In the embodiment, the blowout port near the irradiation region is the first blowout port F1 or the second blowout port F2, and the suction port far away from the irradiation region is the first suction port V1.

As shown in FIG. 1, the first suction port V1 is disposed as far away from the irradiation region as possible, so as not to disturb the powder layer. The first suction port V1 is disposed on a right side wall 14 far away from the irradiated region, among the side walls facing the direction of the U axis. The first suction port V1 is at a lower position of the housing 1, such that the fumes do not interfere with the irradiation path. In this embodiment, the first suction port V1 is located higher than the recoater head 3 considering the rise of the fumes.

Figure 6:
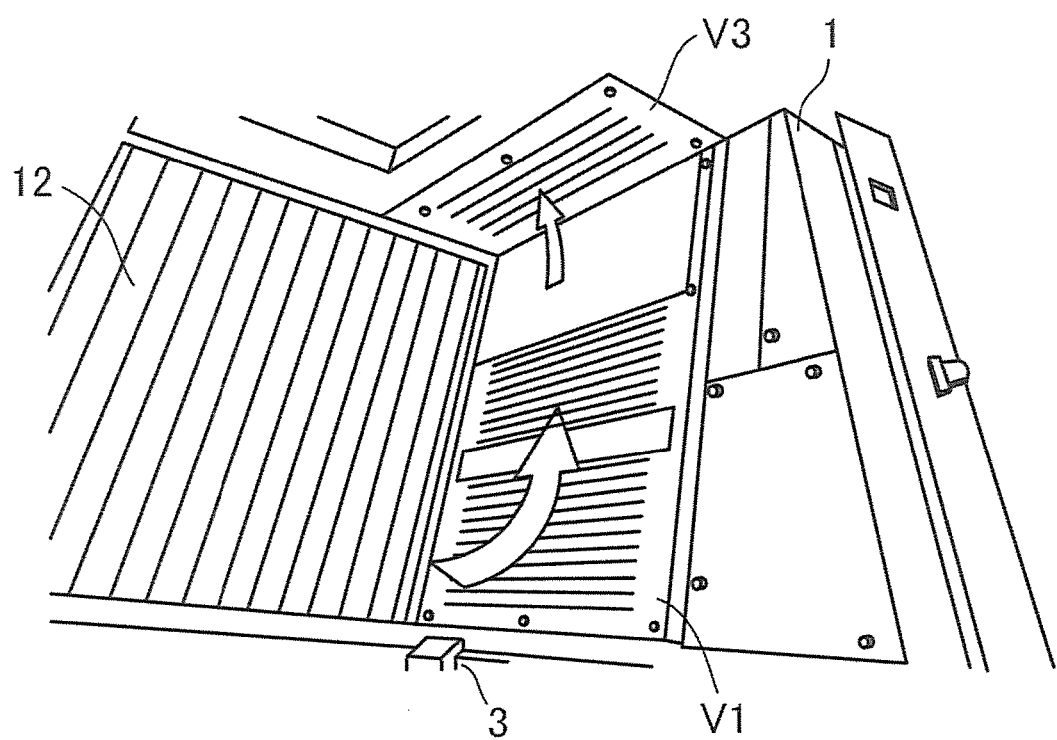
FIG. 6 is a perspective view showing the first suction port V1 and the fifth suction port vs.

The inert gas supply device 4 includes the suction device 50 for sucking the inert gas in the molding chamber 1B. The suction device 50 is disposed outside the housing 1 and includes a casing 52 surrounding the first suction port V1 and a fan or blower 54 installed in the casing 52. The first suction port V1 is covered by an appropriate panel, as shown in FIG. 6. The casing 52 is connected to a duct box 56 by an appropriate duct. The suction device 50 strongly draws the fumes from the irradiation region to the first suction port V1. Moreover, the suction device 50 helps discharge more fumes through the first suction port V1 to prevent the fumes from diffusing in the molding chamber 1B.

An air flow of the fan or blower 54 is large enough to achieve the effects of guiding the fumes from the irradiation region to the first suction port V1 and maintaining the concentration of the inert gas in the molding chamber 1B at or above a predetermined value. Nevertheless, the air flow of the fan or blower 54 is small enough so as not to disturb the powder layer. The air flow may be determined by performing a test operation.

The first blowout port F1 is disposed on a side of the recoater head 3, which extends in the direction perpendicular to the U axis, to face the first suction port V1. Since the first suction port V1 is disposed on the right side wall 14, the first blowout port F1 is disposed on the right side of the sides of the recoater head 3. The nitrogen gas fed from the first supply source 42 flows from the first blowout port F1 toward the first suction port V1 across the irradiation path of the laser beam.

As shown in FIG. 3, the second blowout port F2 is disposed above the base 64 to face the first suction port V1 across the irradiation region. The second blowout port F2 is connected to the first supply source 42 by an appropriate pipe that penetrates through a left side wall 16 of the housing 1. The second blowout port F2 is located right above the base 64 and is disposed close to the irradiation region without interfering with the recoater head 3.

When the recoater head 3 moves from the second position to the first position and has passed the irradiation region, the second blowout port F2 is opened to substitute the first blowout port F1. Thus, a flow of the inert gas from the second blowout port F2 toward the first suction port V1 across the irradiation path is formed. The second blowout port F2 supplies the inert gas at the same pressure and flow rate as the inert gas supplied from the first blowout port F1 to the first suction port V1. Accordingly, the direction of the flow of the inert gas is substantially the same, regardless of the position of the recoater head 3, so as to carry out stable sintering.

The inert gas supply device 4 includes a second suction port V2 in addition to the first suction port V1. The second suction port V2 is disposed on another side of the recoater head 3, which extends in the direction perpendicular to the U axis. The second suction port V2 assists the first suction port V1 only when the second blowout port F2 supplies the inert gas to the molding chamber 1B in place of the first blowout port F1.

The inert gas supply device 4 includes a third suction port V3. The third suction port V3 is disposed on the ceiling of the housing 1 in a right side part of the metal 3D printer. The third suction port V3 is preferably disposed right above the first suction port V1 if possible. As shown in FIG. 6, the third suction port V3 may be disposed on a lower ceiling 1A that is lowered due to installation of the material supply device 7.

The inert gas supply device 4 may include a fourth suction port V4 as long as a maximum supply amount of the inert gas is not exceeded. The fourth suction port V4 extends along the guide rail 68 and is directed toward the irradiation region. As shown in FIG. 1 and FIG. 3, the fourth suction port V4 is disposed in the rear part of the metal 3D printer. Nevertheless, the fourth suction port V4 may extend along the guide rail 69 and be disposed in the front part of the metal 3D printer instead.

It is advantageous to dispose a fifth suction port V5 that faces the fourth suction port V4 across the irradiation region. Depending on the irradiation position, it is possible that the fumes may drift without riding on the flow of the inert gas toward the first suction port V1. The fourth suction port V4 and the fifth suction port V5 are disposed in order to discharge the drifting slight fumes.

The inert gas supply device 4 further includes a third blowout port F3. As better shown in FIG. 1, the third blowout port F3 is disposed on the left side wall 16 of the housing 1 to prevent a decrease in the nitrogen gas concentration. The third blowout port F3 supplies the inert gas recycled by the fume collector 46 to the molding chamber 1B according to the nitrogen gas concentration.

The drive device 5 includes an X movable body 5X, a Y movable body 5Y, and a machining head 5Z for moving the cutting tool with respect to the three-dimensional object. The X movable body 5X is placed on a bed 6 to be movable in the direction of a horizontal X axis. The X axis is a control axis for moving the cutting tool to the left or the right. The Y movable body 5Y is placed on the X movable body 5X to be movable in the direction of a horizontal Y axis perpendicular to the X axis. The machining head 5Z is attached to a front side of the Y movable body 5Y to be movable in the direction of a vertical Z axis. A spindle (not shown) is disposed rotatably in the machining head 5Z, and the cutting tool is attached to the spindle. The drive device 5 stands by on the left end of the metal 3D printer during the sintering process.

A laser irradiation device 9 is disposed above the housing 1. As shown in FIG. 3, the laser irradiation device 9 includes a laser source 9A and a galvanoscanner 9B. The galvanoscanner includes a pair of rotatable galvanometer mirrors for a laser beam to scan on the powder layer in the irradiation region. The laser beam is not limited to a certain type as long as it can sinter the metal powder. For example, a $CO_2$ laser, a fiber laser, and a YAG laser may be used.

The ceiling of the housing 1 has a circular window 1E located under the laser irradiation device 9. The window 1E is composed of a material that transmits the laser beam but reduces the energy or distorts the traveling direction of the laser beam as little as possible. In the case that the laser beam is a fiber laser or a YAG laser, the window 1E is made of quartz glass, for example. The laser beam passes through the window 1E and the molding chamber 1B to form the sintered layer in the irradiation region.

An air purge device 8 is an example of a means for preventing the fumes from adhering to the window 1E and constitutes a part of the inert gas supply device 4. The air purge device 8 includes a cylindrical housing 82, a cylindrical partition 86, and the fourth blowout port F4. The cylindrical housing 82 is fixed to the ceiling of the housing 1 to surround a lower surface of the window 1E. A circular opening 84 for the laser beam to pass is formed on a bottom surface of the cylindrical housing 82.

The cylindrical partition 86 is disposed between the ceiling of the housing 1 and the bottom surface of the cylindrical housing 82 to surround the lower surface of the window 1E. A plurality of pores are formed in the cylindrical partition 86. The pores extend in a radial direction. An annular space is formed by the ceiling of the housing 1, the cylindrical housing 82, and the cylindrical partition 86. The fourth blowout port F4 is connected to the first supply source 42 and is formed in the ceiling of the housing 1 to be opened to the annular space. The air purge device 8 expels gases from the cylindrical housing 82 so as to protect the window 1E from the fumes.

The clean inert gas supplied into the annular space from the fourth blowout port F4 passes through the pores to fill the cylindrical housing 82 right below the window 1E. The inert gas is further ejected to the outside of the cylindrical housing 82 through the circular opening 84 and flows downward substantially coaxially with the irradiation path of the laser beam. The inert gas ejected from the circular opening 84 expels the fumes, which are to flow across the irradiation path of the laser beam, toward the side walls of the housing 1.

An operation of the inert gas supply device 4 is described hereinafter. The inert gas supply source 40 supplies clean nitrogen gas from the first supply source 42 to the molding chamber 1B through the first blowout port F1 and supplies clean nitrogen gas from the second supply source 44 to the drive chamber 1C through the fifth blowout port F5 by controlling a control valve according to an instruction of the controller 10. In addition, clean nitrogen gas is supplied from the first supply source 42 to the air purge device 8 through the fourth blowout port F4. The recoater head 3 and the laser irradiation device 9 stand by until the nitrogen gas concentration in the molding chamber 1B reaches a predetermined value, that is, until the oxygen concentration drops below a predetermined value.

In the embodiment, a door detector (not shown) for detecting the opening and closing of the working door is connected to the controller 10. When the door detector detects that the working door is opened, the controller 10 stops the supply of the nitrogen gas from the first supply source 42 but maintains the supply of the nitrogen gas from the second supply source 44. When the working door is closed and the controller 10 resumes supplying the nitrogen gas from the first supply source 42 to the molding chamber 1B, the nitrogen gas in the drive chamber 1C flows into the molding chamber 1B through the gap between the housing 1 and the bellows 12. Consequently, the time required for lowering the oxygen concentration in the molding chamber 1B below the predetermined value is shortened.

The inert gas supply source 40 raises the flow rate of the nitrogen gas supplied to the molding chamber 1B to be higher than the flow rate of the nitrogen gas supplied to the drive chamber 1C, so as to purge the molding chamber 1B. The controller 10 controls the fan or blower 54 and the fume collector 46 to operate during supply of the nitrogen gas from the first supply source 42.

The nitrogen gas from the first supply source 42 is ejected from the first blowout port F1 in the lower part of the molding chamber 1B. The first blowout port F1 is disposed on the right side of the recoater head 3 to face the first suction port V1 across the irradiation region. As a result, a lateral flow of the nitrogen gas from the first blowout port F1 to the first suction port V1 is created.

The controller 10 opens the first blowout port F1 when the recoater head 3 is in the second position or located on the left side with respect to the irradiation region. The first blowout port F1 ejects fresh nitrogen gas near a generation source of the fumes. Therefore, it is possible to remove the fumes that have just been generated from the irradiation path of the laser beam. The controller 10 closes the first blowout port F1 and opens the second blowout port F2 and the second suction port V2 when the recoater head 3 is in the first position or located on the right side with respect to the irradiation region. The second blowout port F2 supplies the nitrogen gas at the same pressure and flow rate as the nitrogen gas supplied from the first blowout port F1 to the molding chamber 1B.

The first suction port V1 is disposed on the right side wall 14 that is far away from the irradiation region. Accordingly, even though the fan or blower 54 removes the dirty gas in the molding chamber 1B strongly, the powder layer is not disturbed. As better shown in FIG. 1, the material supply device 7 is located near the first position of the recoater head 3 and therefore a part of the ceiling of the housing 1 is lowered. As a result, a drift of the fumes may be formed right below the material supply device 7. Since the first suction port V1 is located right below the material supply device 7, the fumes are forcibly discharged by the fan or blower 54 together with the nitrogen gas, so as to prevent the drift.

The fumes that ride on the updraft from right below the material supply device 7 and soar along the nearby right side wall 14 are discharged from the fifth suction port V5. FIG. 6 illustrates the fifth suction port V5 that effectively removes such fumes.

The first blowout port F1 is disposed on the right side of the recoater head 3 and the second suction port V2 is disposed on the left side of the recoater head 3. The second suction port V2 operates only when the first blowout port F1 is closed. The second suction port V2 helps to remove the fumes that flow from the second blowout port F2 toward the first suction port V1 across the irradiation region. Since the second suction port V2 is not equipped with a fan or blower, there is no concern of disturbing the powder layer.

The controller 10 keeps at least one of the third suction port V3 and the fourth suction port V4 constantly open during molding. The nitrogen gas discharged from the first suction port V1 through the fifth suction port V5 is collected in the duct box 56 and sent to the fume collector 46. The fume collector 46 removes the generated fine metal particles by cooling the fumes, so as to purify the nitrogen gas. The recycled nitrogen gas is collected in the duct box 58 from the fume collector 46 and sent to the third blowout port F3 at a predetermined flow rate.

The clean recycled nitrogen gas that has been purified by the fume collector 46 is supplied to the molding chamber 1B from the third blowout port F3. The third blowout port F3 is disposed on the left side wall of the housing 1 to face the first suction port V1 across the irradiation region. The nitrogen gas supplied from the third blowout port F3 prevents a decrease in the concentration of the nitrogen gas in the molding chamber 1B.

The embodiments were chosen in order to explain the principles of the invention and its practical application. Various improvements and modifications can be made with reference to the above descriptions. The fan or blower 54 is disposed in the casing 52 that surrounds the first suction port V1. However, it may also be disposed in a duct between the first suction port V1 and the duct box 56. It is intended that the scope of the invention is defined by the claims below.

What is claimed is:

1. A metal 3D printer adapted for laminate-molding a three-dimensional object, the metal 3D printer comprising:
   a housing comprising a plurality of side walls to form a molding chamber;
   a recoater head reciprocating between a first position and a second position in a direction of a horizontal U axis in the lower part of the molding chamber and having a total length greater than that of an irradiation region extending in a direction perpendicular to the U axis to form a powder layer of a metal;
   a laser irradiation device irradiating the irradiation region in the powder layer with a laser beam to form a sintered layer; and an inert gas supply device circulating an inert gas through the molding chamber to remove fumes generated in the irradiation region from the molding chamber, wherein the inert gas supply device comprises:

a first suction port disposed on one of the side walls facing each other in the direction of the U axis, which is closer to the first position than the second position;

a first blowout port disposed on a side of the recoater head to face the first suction port; and a second blowout port disposed to face the first suction port across the irradiation region.

2. The metal 3D printer according to claim 1, further comprising a controller that controls the inert gas supply device, wherein the controller closes the first blowout port and opens the second blowout port when the recoater head is in the first position, and closes the second blowout port and opens the first blowout port when the recoater head is in the second position.

3. The metal 3D printer according to claim 1, wherein the inert gas supply device comprises a suction device that sucks the inert gas in the molding chamber through the first suction port.

4. The metal 3D printer according to claim 3, wherein the suction device comprises a fan or a blower.

5. The metal 3D printer according to claim 4, wherein the suction device comprises a casing that surrounds the first suction port, and the fan or the blower is disposed in the casing.

6. The metal 3D printer according to claim 3, wherein the suction device is disposed outside the housing.

7. The metal 3D printer according to claim 1, wherein the inert gas supply device comprises a second suction port that is disposed on the other side of the recoater head to face the second blowout port.

8. The metal 3D printer according to claim 1, further comprising a material supply device that supplies powder to the recoater head, wherein the first suction port is disposed below the material supply device.

9. The metal 3D printer according to claim 8, wherein the housing comprises a ceiling and the inert gas supply device comprises a third suction port disposed on the ceiling.

10. The metal 3D printer according to claim 9, wherein the ceiling comprises a lower ceiling, and the material supply device and the third suction port are disposed on the lower ceiling.

11. The metal 3D printer according to claim 1, further comprising two guide rails disposed on two sides of the irradiation region to guide the recoater head, wherein the inert gas supply device comprises a fourth suction port that is disposed along at least one of the two guide rails and is opened to the irradiation region.

12. The metal 3D printer according to claim 1, wherein the inert gas supply device comprises a third blowout port that is disposed on one of the side walls to face the first suction port across the irradiation region.

13. The metal 3D printer according to claim 1, wherein the housing comprises a ceiling that comprises a window under the laser irradiation device, and the inert gas supply device comprises a cylindrical housing surrounding a lower surface of the window and a fourth blowout port formed on the ceiling to be opened to an inside of the cylindrical housing.

* * * * *